(12) United States Patent
Pursifull

(10) Patent No.: US 8,839,755 B2
(45) Date of Patent: Sep. 23, 2014

(54) ELECTRICALLY DRIVEN VACUUM PUMP FOR A VEHICLE

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 13/429,178

(22) Filed: Mar. 23, 2012

(65) Prior Publication Data
US 2013/0249275 A1    Sep. 26, 2013

(51) Int. Cl.
*F02M 35/10*    (2006.01)

(52) U.S. Cl.
USPC ..................................... 123/184.22

(58) Field of Classification Search
CPC .. F02B 2075/025; F02B 25/26; F02B 61/045; F02M 35/1019; F02M 35/10275
USPC ..................................... 123/184.42
See application file for complete search history.

(56) References Cited

U.S. PATENT DOCUMENTS

| 4,459,088 A | 7/1984 | McClain |
| 4,554,786 A * | 11/1985 | Takeuchi et al. ............... 60/397 |
| 4,738,112 A | 4/1988 | Nomura et al. |
| 4,953,447 A * | 9/1990 | Bender .......................... 91/514 |
| 2002/0129780 A1 * | 9/2002 | Nohara et al. ............. 123/90.16 |
| 2003/0010309 A1 * | 1/2003 | Tsukii et al. ............. 123/184.42 |
| 2007/0284937 A1 | 12/2007 | Deiml et al. |
| 2009/0169400 A1 * | 7/2009 | Paarikh et al. ................ 417/362 |
| 2010/0024785 A1 * | 2/2010 | Yoshioka ................... 123/559.1 |
| 2011/0176931 A1 | 7/2011 | Pursifull |

\* cited by examiner

*Primary Examiner* — Lindsay Low
*Assistant Examiner* — Charles Brauch
(74) *Attorney, Agent, or Firm* — Julia Voutyras; Alleman Hall McCoy Russell & Tuttle LLP

(57) ABSTRACT

A system for supplying vacuum to a vacuum consumption device of a vehicle is disclosed. The system includes an electrically driven vacuum pump selectively routing air to an air intake system upstream and downstream of a turbocharger.

20 Claims, 3 Drawing Sheets

ELECTRICALLY DRIVEN VACUUM PUMP FOR A VEHICLE

BACKGROUND AND SUMMARY

Vacuum may be consumed by various devices in a vehicle. For example, vacuum may be utilized in brake assist or a power braking system to multiply force that is applied by a vehicle operator to a brake pedal. The multiplied force may be applied to a master brake cylinder to provide vehicle braking. The brake assist may allow the vehicle operator to apply the brakes with less effort and more comfort relative to unassisted braking. In some implementations, at least some vacuum for brake assist may be provided by an electrically driven vacuum pump (EVP).

In one example, an electrically driven vacuum pump is operable to pump air from a boosted engine to provide vacuum for a brake booster. In particular, during operation of the electrically driven vacuum pump, air is pumped from the brake booster, through the electrically driven vacuum pump, and exhausted to the intake manifold downstream of the turbocharger.

However, the inventors herein have recognized potential issues with such an approach. For example, since air is merely circulated to and from the intake manifold downstream of the turbocharger, a differential pressure and correspondingly the air flow rate of the electrically driven vacuum pump is low. Accordingly, the electrically driven vacuum pump may be operated more frequently to meet the vacuum consumption demands of the brake booster. This may result in a shorter operational lifespan of the electrically driven vacuum pump. Moreover, the low air flow rate may result in a slow rate of vacuum production when the electrically driven vacuum pump is turned on.

Thus, in one example, some of the above issues may be addressed by a system for supplying vacuum to a vacuum consumption device of a vehicle. The system includes an electrically driven vacuum pump selectively routing air to an air intake system upstream of a turbocharger compressor and downstream of a throttle into the intake manifold.

By selectively routing air exhausted from the electrically driven vacuum pump upstream of the turbocharger or into the intake manifold, air may be exhausted to a lowest available pressure. Accordingly, the pressure differential and correspondingly the air flow rate of the electrically driven vacuum pump may be increased relative to a configuration that merely routes air to the intake manifold downstream of the turbocharger. In this way, the electrically driven vacuum pump may be operated less frequently, and the operational lifespan of the electrically driven vacuum pump may be increased relative to the configuration that merely routes air to the intake manifold downstream of the turbocharger.

Furthermore, the increase of the air flow rate reduces brake vacuum recovery time. In this way, a suitable amount of vacuum may be provided for repeated brake actuations. Moreover, the increased flow rate generates a greater amount of vacuum that may facilitate the downsizing of the electrically driven vacuum pump by a pump size. In this way, a cost and weight reduction of the vehicle may be achieved.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The present description relates to systems and methods for supplying vacuum to a vacuum consumption device of a vehicle using an electrically driven vacuum pump. More particularly, the present description relates to selectively routing air flow from the electrically driven vacuum pump to a lowest available pressure of the vehicle based on operation conditions.

Figure 1:
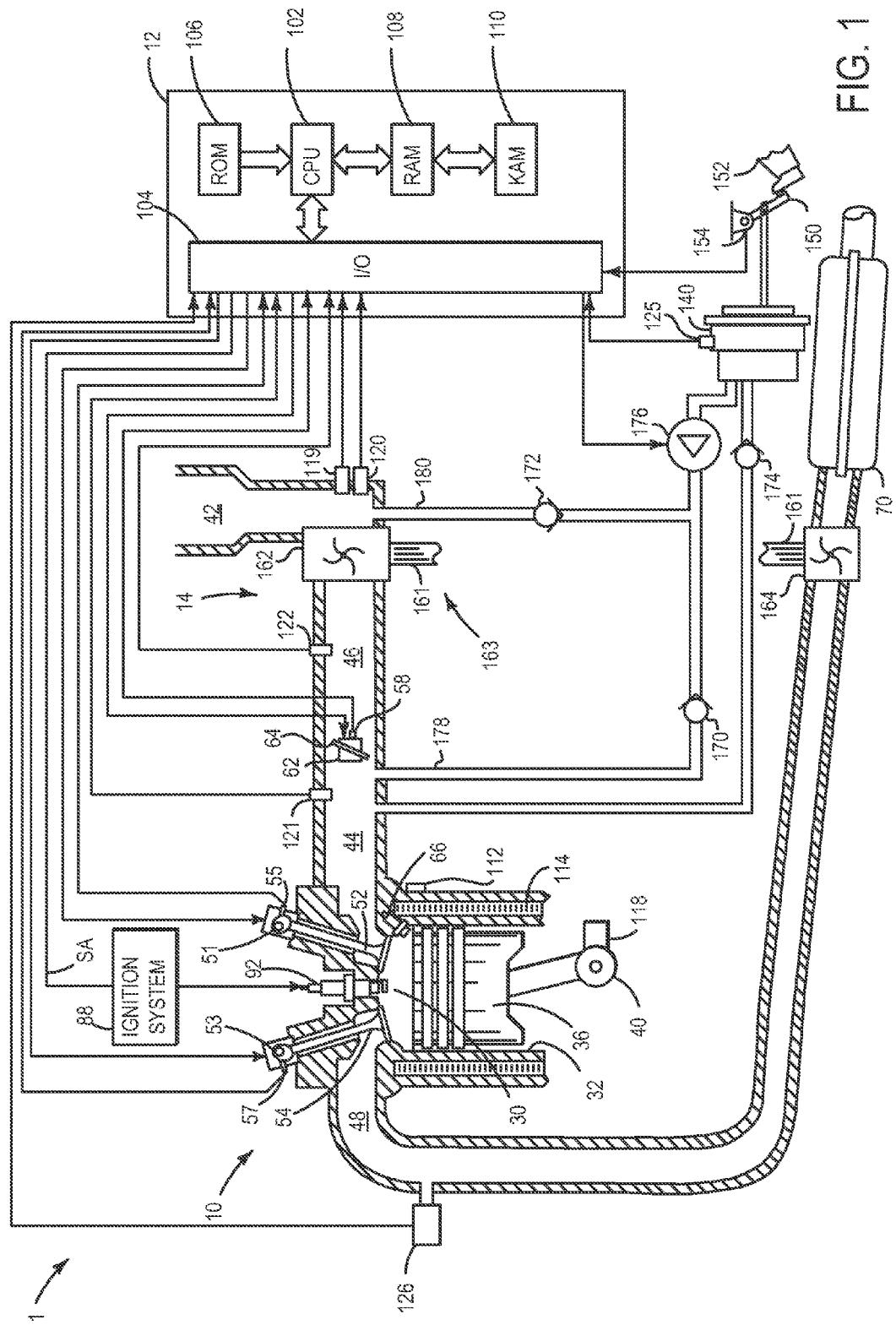
FIG. 1 shows a schematic depiction of a vehicle including an engine and an electrically driven vacuum pump.
Figure 2:
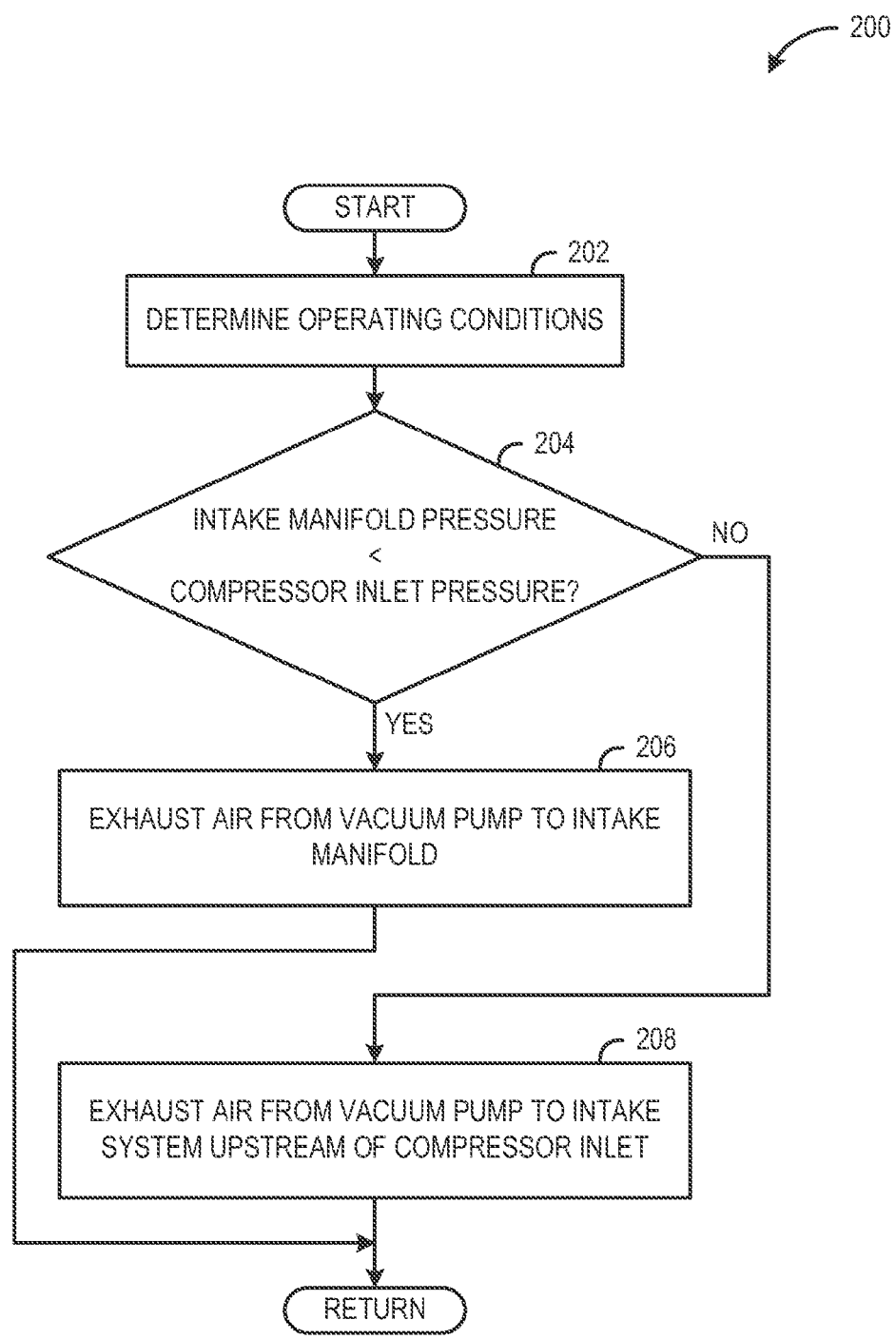
FIG. 2 shows a high level flow chart illustrating a routine that may be implemented for supplying vacuum to a vacuum consumption device of the vehicle of FIG. 1.
Figure 3:
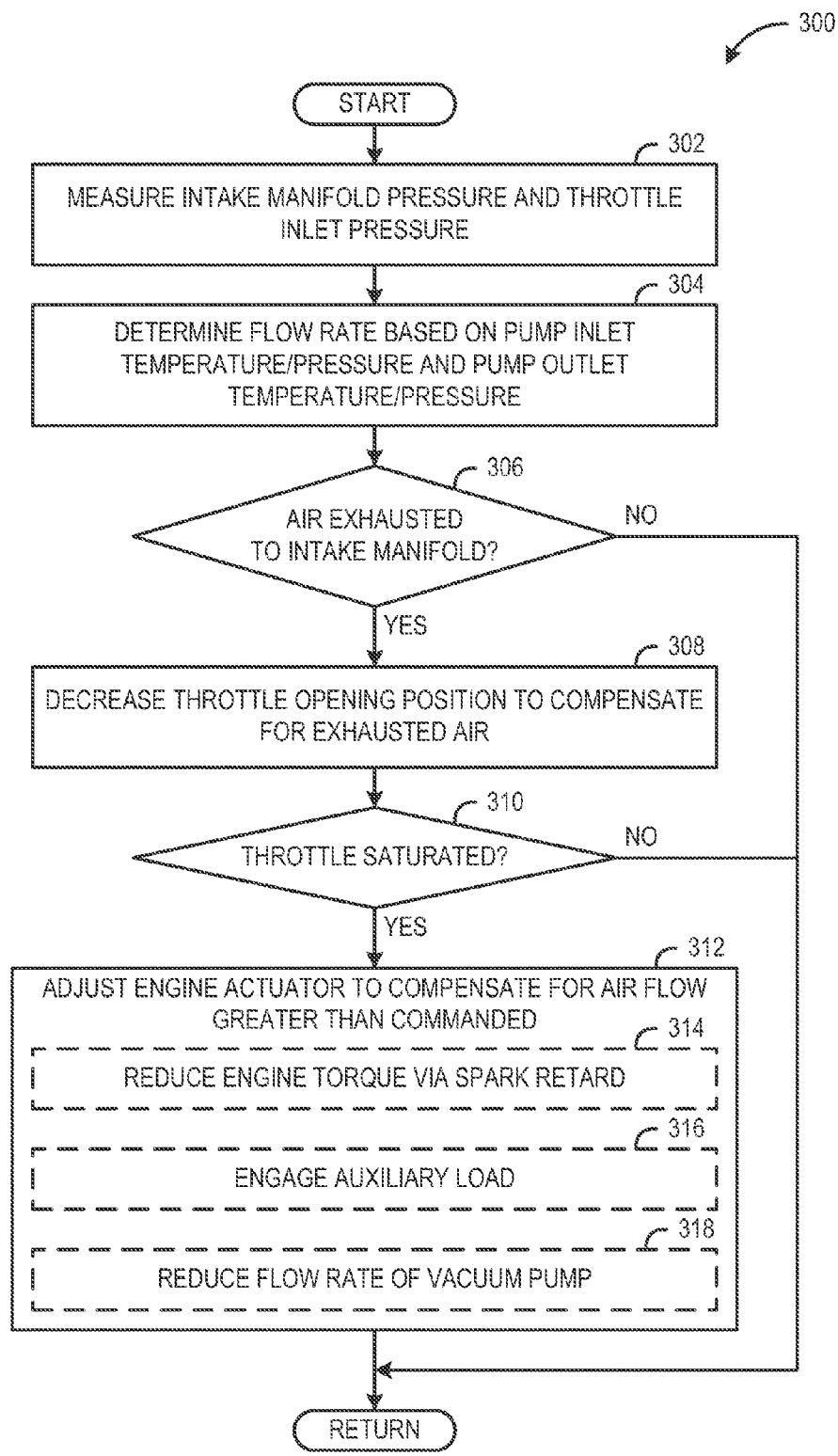
FIG. 3 shows a high level flow chart illustrating a routine that may be implemented for adjusting an engine actuator based on routing of air exhausted by the electrically driven vacuum pump of FIG. 1.

As shown in FIGS. 1-2 an electrically driven vacuum pump may selectively route air upstream and downstream of a turbocharger in a boosted engine. In one example, air may be routed from the electrically driven vacuum pump to the intake manifold downstream of the turbocharger when a pressure in the intake manifold is lower than a pressure in the air intake system upstream of the turbocharger. On the other hand, air may be routed from the electrically driven vacuum pump to the air intake system upstream of the turbocharger when a pressure in the air intake system upstream of the turbocharger is lower than a pressure in the intake manifold. Accordingly, an air flow rate and vacuum of the electrically driven vacuum pump may be increased relative to a configuration that merely circulates air to and from a single location having the same pressure. A controller may be configured to perform routines, such as depicted in FIG. 3, for supplying vacuum to a vacuum consumption device of the vehicle of FIG. 1.

FIG. 1 shows a schematic depiction of a vehicle system 1. The vehicle system 1 includes an internal combustion engine 10. The internal combustion engine 10 comprising a plurality of cylinders, one cylinder of which is shown in FIG. 1, is controlled by an electronic engine controller 12. The engine 10 includes a combustion chamber 30 and cylinder walls 32 with a piston 36 positioned therein and connected to a crankshaft 40.

An air intake system 14 may coupled to the engine 10. The air intake system 14 includes an air intake 42, a compressor 162 of a turbocharger 163, a boost chamber 46, an intake manifold 44 and a throttle valve 62. The air intake 42 may be positioned upstream of the compressor 162 of the turbocharger 163. The boost chamber 46 and the intake manifold 44 may be positioned downstream of the compressor 162 of the turbocharger 163. The throttle valve 62 may be positioned in the intake manifold 44 downstream of the boost chamber 46.

The combustion chamber 30 is shown communicating with the intake manifold 44 and an exhaust manifold 48 via respective intake valve 52 and exhaust valve 54. Each intake and exhaust valve may be operated by an intake cam 51 and an exhaust cam 53. In some embodiments, one or more of the intake and exhaust valves may be operated by an electromechanically controlled valve coil and armature assembly. The position of intake the cam 51 may be determined by an intake cam sensor 55. The position of exhaust the cam 53 may be determined by an exhaust cam sensor 57.

A fuel injector 66 is shown positioned to inject fuel directly into the cylinder 30, which is known to those skilled in the art as direct injection. Alternatively, fuel may be injected to an intake port, which is known to those skilled in the art as port injection. The fuel injector 66 delivers liquid fuel in proportion to a pulse width of signal FPW that may be sent from the controller 12. Fuel is delivered to the fuel injector 66 by a fuel system (not shown) including a fuel tank, fuel pump, and fuel rail (not shown). The fuel injector 66 is supplied operating current from an electronic driver 95 which responds to the controller 12. In addition, the intake manifold 44 is shown communicating with the throttle valve 62 which adjusts a position of a throttle plate 64 to control air flow from the intake boost chamber 46.

The compressor 162 draws air from the air intake 42 to supply the boost chamber 46 and the intake manifold 44. Exhaust gases spin a turbine 164 of the turbocharger 163 which is coupled to the compressor 162 via a shaft 161. A waste gate actuator (not shown) may allow exhaust gases to bypass the turbine 164 so that boost pressure can be controlled under varying operating conditions.

A brake booster 140, including a brake booster reservoir, may be coupled to the intake manifold 44 via a check valve 174. In this way, the brake booster 140 is in pneumatic communication with the intake manifold. The check valve 174 allows air to flow from the brake booster 140 to the intake manifold 44 and limits air flow to the brake booster 140 from the intake manifold 44. The check valve 174 accommodates fast pull down of the reservoir pressure when reservoir pressure (e.g., of brake booster 140) is high relative to the intake manifold. The brake booster 140 may include an internal vacuum reservoir, and it may amplify force provided by a vehicle operator 152 via a brake pedal 150 to a master cylinder for applying vehicle brakes (not shown). A position of the brake pedal 150 may be monitored by a brake pedal sensor 154.

Additionally, or alternatively, an electrically driven vacuum pump 176 may be selectively operated via a control signal from the controller 12 to supply at least some vacuum to the brake booster 140. The electrically driven vacuum pump 176 may be positioned between and fluidly coupled with the brake booster 140 and points in the air intake system 14 upstream and downstream of the compressor 162 of the turbocharger 163. Accordingly, the electrically driven vacuum pump 176 may selectively route air to the air intake system 14 upstream and downstream of the turbocharger 163 based on operating conditions. In other words, the electrically driven vacuum pump 176 may route air to a lowest available pressure point. In this way, air flow and vacuum of the electrically driven vacuum pump 176 may be increased relative to a configuration where an electrically driven vacuum pump merely exhausts air to an intake manifold or into a pressure near atmospheric pressure (e.g. crankcase pressure).

A check valve 170 may be positioned between the electrically driven vacuum pump 176 and the intake manifold 44. The check valve 170 may be configured to route air exhausted from the electrically driven vacuum pump 176 to the intake manifold 44 downstream of the throttle valve 62 via a passage 178 when a pressure in the intake manifold 44 is lower than a pressure in the air intake system 14 upstream of the turbocharger 163.

For example, during low engine load conditions, such as during an idle condition where little air flows through the turbocharger 163, a pressure in the intake manifold 44 may be lower than a pressure upstream of the turbocharger 163 in the air intake 42, such as atmospheric pressure. Under such conditions, air may be routed from the electrically driven vacuum pump 176 to the intake manifold 44 downstream of the turbocharger 163 because the lowest available pressure point for air to be routed between upstream and downstream of the turbocharger 163 is in the intake manifold 44.

A check valve 172 may be positioned between the electrically driven vacuum pump 176 and the air intake system 14 upstream of the turbocharger 163. The check valve 172 may be configured to route air to the air intake system 14 upstream of the turbocharger 163 via a passage 180 when a pressure in the air intake system 14 upstream of the turbocharger 163 is lower than a pressure in the intake manifold. In one example, the electrically driven vacuum pump 176 selectively routes air to atmosphere upstream of the turbocharger 163. In other words, the passage 180 may be fluidly coupled with the air intake 42.

For example, during high engine load conditions where a higher amount of air flows through the turbocharger 163 to generate boost, a pressure in the intake manifold 44 may be higher than a pressure upstream of the turbocharger 163 in the air intake 42 due to compression generated by the turbocharger 163. Under such conditions, air may be routed from the electrically driven vacuum pump 176 to the air intake 42 upstream of the turbocharger 163 because the lowest available pressure point for air to be routed between upstream and downstream of the turbocharger 163 is in the air intake 42.

By routing air from the electrically driven vacuum pump to a lowest available pressure, the exhaust port pressure of the electrically driven vacuum pump may be lower than a configuration where air is merely routed to a single location. This lowered exhaust pressure causes increased air flow and vacuum of the electrically driven vacuum pump. In other words, by routing air from the electrically driven vacuum pump to a lowest available pressure, performance of the electrically driven vacuum pump may be increased and the electrically driven vacuum pump may be operated less frequently (e.g., the duty cycle may be reduced). This may facilitate the implementation of a smaller pump that may reduce the cost and weight of the vehicle.

In the illustrated embodiment, the electrically driven vacuum pump supplies vacuum to the brake booster. However, it will be appreciated that the electrically driven vacuum pump may supply vacuum to one or more suitable vacuum consumption devices without departing from the scope of the present description. For example, a vacuum consumption device may include at least one of a brake booster, a crankcase ventilation system, and a fuel vapor purge canister.

A distributorless ignition system 88 provides an ignition spark to the combustion chamber 30 via a spark plug 92 in response to the controller 12. The controller 12 may be configured to adjust a spark timing of the ignition system 88 based on operating conditions. In one example, the controller 12 may be configured to retard a spark timing of the ignition system 88 to compensate for air being routed downstream of the turbocharger 163 into the intake manifold 44 relative to a spark timing when air is routed upstream of the turbocharger 163 into the air intake 42. An Universal Exhaust Gas Oxygen (UEGO) sensor 126 is shown coupled to the exhaust manifold 48 upstream of a catalytic converter 70. Alternatively, a two-state exhaust gas oxygen sensor may be substituted for UEGO sensor 126.

The converter 70 can include multiple catalyst bricks, in one example. In another example, multiple emission control devices, each with multiple bricks, can be used. The converter 70 can be a three-way type catalyst in one example.

The controller 12 is shown in FIG. 1 as a conventional microcomputer including: a microprocessor unit 102, input/output ports 104, a read-only memory 106, a random access memory 108, a keep alive memory 110, and a conventional data bus. The controller 12 commands various engine actuators based on received sensor signal indicative of operating conditions of the vehicle. The controller 12 is shown receiving various signals from sensors coupled to engine 10, in addition to those signals previously discussed, including: engine coolant temperature (ECT) from a temperature sensor 112 coupled to a cooling sleeve 114; the position sensor 154 coupled to the brake pedal 150 for sensing brake pedal position; a knock sensor for determining ignition of end gases (not shown); a measurement of engine manifold pressure (MAP) from a pressure sensor 121 coupled to the intake manifold 44; a measurement of boost pressure from a pressure sensor 122 coupled to the boost chamber 46; brake booster reservoir pressure from a pressure sensor 125, an engine position sensor from a Hall effect sensor 118 sensing a crankshaft 40 position; a measurement of air mass entering the engine from a sensor 120 (e.g., a hot wire air flow meter); and a measurement of throttle position from sensor 58. Barometric pressure may be sensed by a pressure sensor 119 coupled to the air intake 42 for processing by the controller 12.

The storage medium read-only memory 106 can be programmed with computer readable data representing instructions executable by the processor 102 for performing the methods described below as well as other variants that are anticipated but not specifically listed.

In one example, the controller 12 may be configured to adjust an engine actuator to compensate for air flow based on routing of air exhausted by the electrically driven vacuum pump 176. More particularly, when a pressure downstream of the turbocharger 163 is lower than a pressure upstream of the turbocharger 163, air may be routed to the intake manifold 44 downstream of the throttle valve 62. The unthrottled air may affect operation of the engine, such as air-fuel control. The controller 12 may be made aware of this source of unthrottled air based on an increase in MAP in the intake manifold 44 while the electrically driven vacuum pump is operating. Unthrottled air flow rates from other sources (brakes, aspirators, crankcase ventilation, purge, and other vacuum-actuated devices) may be computed and fed to the controller 12 so the throttle can control air charge appropriately. As such, the controller 12 may be configured to adjust one or more actuators to compensate for the introduction of the additional air to the intake manifold 44 to control air charge appropriately.

In one example, the actuator includes the ignition system 88, and the controller 12 may be configured to retard a spark timing of the ignition system 88 to compensate for air being routed downstream of the turbocharger 163 and downstream of the throttle valve 62 relative to a spark timing when air is routed upstream of the turbocharger 163. In another example, the actuator includes the throttle valve 62, and the controller 12 may be configured to decrease an opening position of the throttle valve 62 to compensate for air being routed downstream of the turbocharger 163 and downstream of the throttle valve 62 relative to an opening position of the throttle valve when air is routed upstream of the turbocharger 163. In yet another example, the actuator includes a variable flow electrically driven pump. In other words, the electrically driven vacuum pump may be configured to vary a flow rate of air that is pumped through the vacuum pump. In this case, the controller 12 may be configured to reduce a flow rate of air pumped through the variable flow electrically driven pump to compensate for air being routed downstream of the turbocharger 163 and downstream of the throttle valve 62 relative to a flow rate when air is routed upstream of the turbocharger 163.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

The configurations illustrated above enable various methods for supplying vacuum to a vacuum consumption device of a vehicle. Accordingly, some such methods are now described, by way of example, with continued reference to above configurations. It will be understood, however, that these methods, and others fully within the scope of the present disclosure, may be enabled via other configurations as well.

FIG. 2 shows a high level flow chart illustrating a routine or method 200 that may be implemented for supplying vacuum to a vacuum consumption device of a vehicle. In one example, the method 200 may be executed by the controller 12 of FIG. 1 to supply vacuum to the brake booster 140. At 202, the method 200 includes determining operating conditions. Determining operating conditions may include receiving sensor signals and determining a state of actuators coupled to the vehicle. For example, with reference to FIG. 1, the method may include determining a pressure upstream of the turbocharger 163 via the pressure sensor 119 and a pressure downstream of the turbocharger 163 via the pressure sensor 121. Further, the method may include determining whether the electrically driven vacuum pump 176 is operating.

At 204, the method 200 includes determining whether a pressure of the intake manifold downstream of the compressor is lower than a pressure upstream of the compressor inlet of the turbocharger. If the intake manifold pressure downstream of the compressor is lower than the pressure upstream of the turbocharger, the method 200 moves to 206. Otherwise, the method 200 moves to 208.

At 206, the method 200 includes routing air exhausted by the electrically driven vacuum pump to the intake manifold when the pressure downstream of the turbocharger is lower than the pressure upstream of the turbocharger. In one particular example, air is routed to the intake manifold downstream of the throttle valve.

At 208, the method 200 includes routing air exhausted by the electrically driven vacuum pump to the air intake system upstream of the compressor inlet when the pressure upstream of the compressor inlet is lower than the intake manifold pressure. In one particular example, air is routed to the air intake at atmospheric pressure.

By routing air exhausted by the electrically driven vacuum pump upstream of the turbocharger when a pressure upstream of the turbocharger is lower than a pressure downstream of the turbocharger and downstream of the turbocharger when the pressure downstream of the turbocharger is lower than the pressure upstream of the turbocharger, an available pressure differential can be increased relative to a method that merely routes air exhausted from an electrically driven vacuum pump to an intake manifold. The vacuum pump exhaust pressure may be leveraged to increase the flow rate and vacuum of the electrically driven vacuum pump. Accordingly, the increased flow rate and vacuum may permit the electrically driven vacuum pump to be operated less frequently. Further, in the case where the vacuum consumption device is a brake booster, the increased flow rate may facilitate faster recovery times of the brake booster during repeated braking. Moreover, the increased vacuum may facilitate the use of a smaller vacuum pump in the vehicle while maintaining adequate flow rate capacity. In this way, the cost and weight of the vehicle may be reduced.

FIG. 3 shows a high level flow chart illustrating a routine/method 300 that may be implemented for adjusting an engine actuator based on routing of air exhausted by an electrically driven vacuum pump. In one example, the method 300 may be executed by the controller 12 of FIG. 1.

At 302, the method 300 includes measuring intake manifold pressure and throttle inlet pressure. These pressure measurements may be used to determine whether the intake manifold pressure is lower than the pressure upstream of the compressor. It may be assumed that the throttle inlet pressure is less than a compressor inlet pressure. Further, it may be assumed that the flow rate of the electrically driven vacuum goes 100% to the lowest pressure sink.

At 304, the method 300 includes determining a flow rate of air exhausted from the electrically driven vacuum pump based on a pump inlet temperature/pressure and a pump outlet temperature/pressure.

At 306, the method 300 includes determining whether air is exhausted from the electrically driven vacuum pump to the intake manifold. This determination may be may be made based on the pressure in the intake manifold relative to the throttle inlet pressure or a pressure upstream of the compressor inlet. If air is exhausted to the intake manifold, then the method 300 moves to 308. Otherwise, the method 300 returns to other operations.

At 308, the method 300 includes reducing air flow through the throttle valve to compensate for the amount of air flow exhausted from the electrically driven vacuum pump. In some cases, the air flow may be decreased by decreasing a throttle opening position. In some cases, the air flow may be decreased by actuating a positive crankcase ventilation valve. In some cases, the air flow may be decreased by purging air to a fuel vapor canister.

At 310, the method 300 includes determining whether the throttle is saturated or the throttle is unable to close further. If the throttle is saturated, then the method 300 moves to 312. Otherwise, the method 300 returns to other operations.

At 312, the method 300 includes adjusting an engine actuator to compensate for air flow greater than the commanded air flow.

In some embodiments, at 314, adjusting the engine actuator includes retarding a spark timing of an ignition system to reduce engine torque to compensate for the air flow being greater than the commanded air flow relative to a spark timing when air is routed upstream of the compressor.

In some embodiments, at 316, adjusting the engine actuator includes engaging an auxiliary load to reduce engine torque. For example, the auxiliary load may include a load from a front end auxiliary drive (FEAD), such as an alternator.

In some embodiments, at 318, adjusting the engine actuator includes reducing a flow rate of air pumped through a variable flow electrically driven vacuum pump to compensate for air being routed downstream of the turbocharger relative to a flow rate when air is routed upstream of the turbocharger.

By adjusting the one or more of the engine actuators to compensate for air that is routed to the intake manifold when a pressure in the intake manifold is lower than a pressure upstream of the compressor, accurate control of air charge entering cylinders of the engine may be maintained.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof. For example in a first operating mode, the electrically driven vacuum pump routes air to an air intake system upstream of a turbocharger compressor, and during a second operating mode, the electrically driven vacuum pump routes air to the intake system downstream of the turbocharger compressor.

The invention claimed is:

1. A system for supplying vacuum to a vacuum consumption device of a vehicle, comprising:
an electrically driven vacuum pump selectively routing air in only one direction from the vacuum pump and to an air intake system upstream and downstream of a turbocharger, the vacuum pump positioned between the vacuum consumption device and the air intake system.

2. The system of claim 1, wherein the air intake system includes an intake manifold fluidly coupled with a compressor of the turbocharger and a throttle valve positioned in the intake manifold downstream of the compressor, and wherein the electrically driven vacuum pump selectively routes air to the intake manifold downstream of the throttle valve.

3. The system of claim 2, further comprising:
a first check valve positioned between the electrically driven vacuum pump and the intake manifold, the first check valve being configured to route air exhausted from the electrically driven vacuum pump in only one direction to the intake manifold downstream of the throttle valve when a pressure in the intake manifold is lower than a pressure in the air intake system upstream of the compressor.

4. The system of claim 3, further comprising:
a second check valve positioned between the electrically driven vacuum pump and the air intake system upstream of the compressor, the second check valve being configured to route air in only one direction to the air intake system upstream of the compressor when a pressure in the air intake system upstream of the turbocharger is lower than a pressure in the intake manifold.

5. The system of claim 1, wherein the electrically driven vacuum pump selectively routes air to atmosphere upstream of the compressor.

6. The system of claim 1, wherein the vacuum consumption device includes a brake booster.

7. The system of claim 1, further comprising:
a controller configured to adjust an engine actuator to compensate for air flow based on routing of air exhausted by the electrically driven vacuum pump.

8. The system of claim 7, wherein the engine actuator includes an ignition system, and the controller being configured to retard a spark timing of the ignition system to compensate for air being routed into the intake manifold relative to a spark timing when air is routed upstream of a compressor of the turbocharger.

9. The system of claim 7, wherein the engine actuator includes a throttle valve, and the controller being configured to decrease an opening position of the throttle valve to compensate for air being routed into the intake manifold relative to an opening position when air is routed upstream of a compressor of the turbocharger.

10. The system of claim 7, wherein the engine actuator includes a variable flow electrically driven pump, and the controller being configured to reduce a flow rate of air pumped through the variable flow electrically driven pump to compensate for air being routed into the intake manifold relative to a flow rate when air is routed upstream of a compressor of the turbocharger.

11. A method for supplying vacuum to a vacuum consumption device of a vehicle, comprising:
routing air exhausted by an electrically driven vacuum pump in only one direction to an air intake system upstream of a turbocharger when a pressure upstream of the turbocharger is lower than an intake manifold pressure, the vacuum pump positioned between the vacuum consumption device and the air intake system; and
routing air exhausted by the electrically driven vacuum pump in only one direction into the intake manifold when the intake manifold pressure is lower than the pressure upstream of the turbocharger.

12. The method of claim 11, further comprising:
adjusting an engine actuator to compensate for air flow based on routing of air exhausted by the electrically driven vacuum pump.

13. The method of claim 12, wherein adjusting includes retarding a spark timing of an ignition system to compensate for air being routed into the intake manifold relative to a spark timing when air is routed upstream of a compressor of the turbocharger.

14. The method of claim 12, wherein adjusting includes decreasing an opening position of a throttle valve to compensate for air being routed into the intake manifold relative to an opening position when air is routed upstream of a compressor of the turbocharger.

15. The method of claim 12, wherein the electrically driven vacuum pump is a variable flow pump and adjusting includes reducing a flow rate of air pumped through the variable flow electrically driven vacuum pump to compensate for air being routed into the intake manifold relative to a flow rate when air is routed upstream of a compressor of the turbocharger.

16. A system for supplying vacuum to a brake booster of a vehicle, comprising:
an air intake system including,
a turbocharger including a compressor;
an intake manifold fluidly coupled with the compressor; and
a throttle valve positioned in the intake manifold downstream of the compressor;
an electrically driven vacuum pump configured to supply vacuum to the brake booster, the electrically driven vacuum pump positioned between the brake booster and the air intake system;
a first check valve positioned between the electrically driven vacuum pump and the intake manifold, the first check valve being configured to route air exhausted from the electrically driven vacuum pump in only one direction to the intake manifold downstream of the throttle valve when a pressure in the intake manifold is lower than a pressure in the air intake system upstream of the compressor; and
a second check valve positioned between the electrically driven vacuum pump and the air intake system upstream of the compressor, the second check valve being configured to route air from the electrically driven vacuum pump in only one direction to the air intake system upstream of the compressor when a pressure in the air intake system upstream of the compressor is lower than a pressure in the intake manifold.

17. The system of claim 16, further comprising:
a controller configured to adjust an engine actuator to compensate for air flow based on routing of air exhausted by the electrically driven vacuum pump.

18. The system of claim 17, wherein the engine actuator includes an ignition system, and the controller being configured to retard a spark timing of the ignition system to compensate for air being routed into the intake manifold relative to a spark timing when air is routed upstream of the compressor.

19. The system of claim 17, wherein the engine actuator includes a throttle valve, and the controller being configured to decrease an opening position of the throttle valve to compensate for air being routed downstream of the turbocharger relative to an opening position when air is routed upstream of the compressor.

20. The system of claim 17, wherein the engine actuator includes a variable flow electrically driven vacuum pump, and the controller being configured to reduce a flow rate of air pumped through the variable flow electrically driven vacuum pump to compensate for air being routed downstream of the turbocharger relative to a flow rate when air is routed upstream of the compressor.

* * * * *